(12) United States Patent
Osae et al.

(10) Patent No.: US 9,845,413 B1
(45) Date of Patent: Dec. 19, 2017

(54) STRUCTURAL ADHESIVE COMPOSITIONS

(71) Applicant: Engineered Bonding Solutions, LLC, Titusville, FL (US)

(72) Inventors: Samuel B. Osae, Titusville, FL (US); Matt Brandli, Melbourne Beach, FL (US)

(73) Assignee: Engineered Bonding Solutions, LLC, Titusville, FL (US)

( * ) Notice: Subject to any disclaimer, the term of this patent is extended or adjusted under 35 U.S.C. 154(b) by 0 days.

(21) Appl. No.: 15/186,947

(22) Filed: Jun. 20, 2016

Related U.S. Application Data

(63) Continuation of application No. 13/625,496, filed on Sep. 24, 2012, now Pat. No. 9,371,476.

(60) Provisional application No. 61/537,850, filed on Sep. 22, 2011.

(51) Int. Cl.
| | | |
|---|---|---|
| *C09J 167/06* | (2006.01) | |
| *C08L 67/06* | (2006.01) | |
| *C09J 4/06* | (2006.01) | |
| *C09J 163/10* | (2006.01) | |

(52) U.S. Cl.
CPC ............... *C09J 4/06* (2013.01); *C08L 67/06* (2013.01); *C09J 163/10* (2013.01); *C09J 167/06* (2013.01); *C08L 2207/53* (2013.01)

(58) Field of Classification Search
CPC ....... C09J 167/06; C09J 163/10; C08L 67/06; C08L 2207/53
See application file for complete search history.

(56) References Cited

U.S. PATENT DOCUMENTS

| | | | | |
|---|---|---|---|---|
| 7,795,351 B2 * | 9/2010 | Osae | ..................... | C08F 263/00 525/212 |
| 7,816,453 B2 * | 10/2010 | Osae | ..................... | C08F 263/00 524/500 |
| 9,371,476 B1 * | 6/2016 | Osae | ..................... | C08L 67/06 |

\* cited by examiner

*Primary Examiner* — Vickey Nerangis
(74) *Attorney, Agent, or Firm* — Suiter Swantz pc llo

(57) ABSTRACT

An adhesive composition may include, but is not limited to: at least one of an alkyl acrylate monomer and a methacrylate monomer; and at least one of a polyester alkyd polymer and a vinyl ester alkyd polymer.

20 Claims, No Drawings

STRUCTURAL ADHESIVE COMPOSITIONS

CROSS-REFERENCE TO RELATED APPLICATION

The present application claims the benefit of U.S. Provisional Application Ser. No. 61/537,850 filed on Sep. 22, 2011. The present application herein incorporates U.S. Provisional Application Ser. No. 61/537,850 by reference in its entirety to the extent not inconsistent herewith.

BACKGROUND OF THE INVENTION

Various adhesive compositions may be used in bonding a broad variety of adherends, including thermoset plastics, thermoplastics and metals. Thermoset plastics may include plastic compositions which may or may not be reinforced with high strength fibers. Examples include fiber reinforced phenolic, polyester, vinyl ester, polyurethanes and epoxy resins. These types of thermoset plastics adherends may be fabricated with various methods including open molding or hand lay-up, sheet molding, resin transfer molding, pultruded molding, centrifugal cast molding, infusion molding and other types of molding processes can be used as well. A finished part can be molded with an in-mold coating, typically to the front surface or cosmetic side of molded part ("A" side surface), whereas the back side of molded part (or "B" side) can be open to cure in the air (open molded) or covered with another mold to cure without presence of air (closed molded) and can either be gel-coated or non-gel-coated. These molding methods can provide vastly different surfaces or adherends.

In addition, mold release compounds can be used to help reduce surface tension of parts to allow for easy release of the finished parts from a mold and can be externally applied to a surface of the mold before fabrication, added to the resin system or internally applied and are forced out while curing. As these mold release compounds are designed to alter surface chemistry or even reduce surface tension of the adherend, they affect the adhesion properties and force additional preparation of substrates (e.g. wiping with alcohol; sanding to remove this surface). Examples of mold release compounds include simple wax types that are applied frequently and come off after a few molding cycles (e.g. bee wax or carnauba wax to polymeric or synthetic resins that bond to mold surface and reduce surface tension). Internal release compounds are forced out while thermoset resin is curing to the surface or exterior surface of part and create lower surface tension or energy. These can be simple (e.g. vegetable oil), complex (e.g. zinc stearates, calcium stearates) or polymeric systems.

Mold release compounds can be used in thermoplastic molding as well. However, thermoplastic adherends present different bonding parameters according to the composition of the thermoplastic resin and surface tension or surface energy of a molded part.

Metals and metal alloys (e.g. carbon steel, stainless steel and aluminum) present a different set of bonding parameters than either thermoset plastics or thermoplastics. They can be coated with oil/grease, protected with a polymer film or a coating (e.g. epoxy or polyester powder coating), or dipped or electroplated with a metallic film (e.g. zinc galvanized, zinc chromate). Without a coating, the metal surface can oxidize and cause under-film corrosion between metal layer and adhesive bond, causing premature bond failure.

The various adherends, whether thermoset, thermoplastic or metal have widely different surface energies and bonding characteristics which makes bonding multiple adherend types using a single adhesive composition difficult. As such, there is a need for an adhesive system formulated with the appropriate elastomeric polymer, core/shell polymer, acrylate or methacrylate based resins, monomers, and curing additives for providing adequate bonding across various adherends with a single adhesive composition platform.

SUMMARY OF THE INVENTION

This invention relates to polymerizable adhesive compositions that are useful for a variety of assembly operations, including, filling, repair and related applications. This invention further relates to two-part, room-temperature curing adhesive compositions, consisting of a mixture of elastomeric polymers, an alkyd or pre-dispersed alkyd of a dicarboxylic acid and dihydric alcohol esterifcation reactionary products in all acrylate and/or methacrylate ester monomers, core/shell impact modifiers (graft-copolymer), acids, reducing agents, retarding agents, inhibitors and initiators. The inventive adhesive composition may include an acrylate and/or methacrylate ester monomers optimized to provide improved bonding to a wide variety of adherends, including most thermoplastics, metals and glass reinforced composites. The inventive adhesive composition is designed to perform and thoroughly cure when applied in both thick and thin bond gaps while maintaining resistance to boiling in large bond beads, providing high shear strength, impact strength, tensile strength and good elongation and bond durability properties.

DETAILED DESCRIPTION

Bonding forces in various adhesives may arise from multiple sources. For example, under a mechanical interlocking bonding mechanism (i.e. mechanical bonding) an adhesive or polymeric material may become mechanically interlocked in pores, holes and crevices or other irregularities of the surface of an adherend. To affect such mechanical bonding, an adhesive composition must have rheological properties such that it will wet the surface of the adherend to flow or penetrate pores and openings in a reasonable amount of time.

In another example, under a diffusion bonding mechanism, mutual solubility of the adherend and adhesive operate to form an interphase whereby material of the adherend and the adhesive become comingled and, upon curing, form a matrix which results in adhesion. Parameters affecting the diffusion process include: contact time, temperature, molecular weight of polymeric materials and physical form (liquid, solid). It will be noted that polarity characteristics of the adherend and/or the adhesive may generally increase adhesion under a diffusion bonding mechanism.

Intermolecular and inter-atomic forces, the surface energies of the adhesive and adherend, and the interfacial energy between the two determine the efficacy of adsorption or "wetability." The most common forces are Van der Waals forces and hydrogen bonding. Also important in wetting is Lewis acid-base, other donor-acceptor (dipole-dipole) interactions and covalent bonding. The wetability is related to the study of contact angles of liquids on solid surfaces. The degree to which a liquid adhesive wets a solid is measured by the contact angle. The surface energy of polymers is an important consideration in the wetability mechanism. The critical wetting surface tension $\gamma_c$ of a solid surface is a criterion for the complete wetting of the surface. The liquid surface tension of the liquid that is wetting a solid surface should be less than the critical wetting tension of the solid surface wetted. When that angle of the liquid equals zero, then the liquid wets the solid completely and spreads freely over the surface at a rate depending on the viscosity of the adhesive and the surface roughness of the solid substrate.

In yet another example, under an electrostatic bonding mechanism, the difference in electro-negativities of adhering materials operates to form an electrostatic bond. If two materials with different electro-negativities are brought into contact, electron transfer from a material having a lower electronegative to that of a material having a higher electronegativity may occur. Adhesive forces are attributed to the transfer of electrons across the interface, creating positive and negative charges that attract one another. For example, when an organic polymer is brought into contact with metal, electrons may be transferred from the metal into the polymer, creating an attracting electrical double layer. In an adhesive, the principle bonding mechanism for adhering non-coated metals and metal alloys are based on electrostatic attraction between the adhesive and the metal.

It may be the case that one or more of the above described bonding mechanisms may be implemented by an adhesive composition. As such, it is desirable to provide a multi-use, single product adhesive composition optimized to exhibit the above described bonding mechanisms for enhanced bonding characteristics to multiple adherend types.

The inventive adhesive composition described herein may include a monomeric liquid having olefinically unsaturated compositions suitable for use in several classes of adhesives for forming polymer-monomer syrups and as additional polymerizable materials that may be characterized by the presence of at least one carbon to carbon double bond. This olefinically unsaturated group is preferably a vinyl group, more preferably terminally located with acrylic and substituted acrylic monomers being currently preferred. Representative olefinically unsaturated monomers include, without limitation, methyl methacrylate, butyl methacrylate, ethyl methacrylate ethyl acrylate, and/or diethylene glycol dimethacrylate. For example, the olefinically unsaturated compositions may be found in the inventive adhesive composition in an amount from about 25.5-80% by weight. More specifically, inventive adhesive composition may include at least one of methyl methacrylate or alkyl acrylate monomer in an amount from about 25-70% by weight (more preferably from about 35-60% by weight) and an acid monomer, preferably methacrylic acid, in an amount from about 0.5-10% by weight (more preferably from about 1.0-9.0% by weight).

The monomer in the inventive adhesive composition may be primarily responsible for wetting the surface of the adherends and, as such, the adhesive composition may include monomers having a reduced surface tension. For example, the monomers may have a surface tension of less than 29.5 dynes/cm at 20° C. and, most preferably, less than 28.5 dynes/cm at 20° C. For example, the surface tension for the most preferred monomer for the invention is methyl methacrylate which has approximately 28 dynes/cm at 20° C. This is in contrast to the surface tension for Styrene which is approximately 31 dynes/cm at 20° C. and Dodecyl Methacrylate (lauryl methacrylate) which is approximately 29 dynes/cm. Specifically, the monomer may be a low-molecular weight (e.g. 1-5 carbon).

Further, the inventive adhesive composition may include a polymeric elastomer selected for its retention of electrostatic properties after it has cured or cross-linked. Such properties may enhance the bonding characteristics of the adhesive composition when applied on metal adherends. Preferably, unsaturated halogenated elastomers which exhibit high electronegativity after cure which results in improved bonding of the inventive adhesive to metal adherends. For example, the inventive adhesive composition may include polymers containing the grouping —$(CH_2$=$CCl$—$CH$=$CH_2)_n$—, wherein n is an integer (i.e. polychloroprene or neoprene). The polymeric elastomer most preferred for the invention is polychloroprene available from DuPont Dow Elastomers marketed under the trade names of neoprene AD, neoprene WB and neoprene WM-I series of rubber, including polychloroprene supplied by other manufacturers. The most preferred polychloroprene elastomer may be found in the inventive adhesive composition in an amount from about 2-30% by weight (more preferably, from about 2.5-25% by weight).

Saturated halogenated or non-halogenated elastomers, block copolymers of linear or radial styrene-butadiene-styrene copolymers, linear or radial styrene-isoprene-styrene copolymers, liquid or solid nitrile elastomers, butadiene-acrylonitrile polymers, chlorinated polyethylene (Tyrin), Chlorosulfonate polyethylene (Hypalon), and/or epichlorhydrin copolymers may be included but are not preferred as the primary elastomers in the inventive adhesive composition.

Further, the inventive adhesive composition may include unsaturated elastomers and/or polymers to provide readily available bonding sites for free acrylate and/or methacrylate monomer to bond with during exothermic free radical reaction. Such properties may serve to effectively reduce boiling tendency of acrylate and/or methacrylate monomer based adhesives. While some elastomers may provide unsaturated sites, the addition of long chain unsaturated polymers may be more effective to reduce exothermic boiling while still providing enhanced adhesion when incorporated with low molecular weight (e.g. 1-5 carbon) acrylate and/or methacrylate monomer in the inventive adhesive composition. More particularly, the unsaturated polymer composition may include an unsaturated polyester, vinyl ester alkyd, polyester and vinyl ester alkyd dispersed in a monomer, or blends thereof. Further, the unsaturated polymer composition may include epoxy, polyurethane (e.g. urethane acrylate, urethane methacrylate resin). The unsaturated polyester or vinyl ester alkyds or an alkyd further diluted in acrylate and/or methacrylate ester monomer may be substantially free of styrene to further improve solubility parameters and reduce the surface tension of the composition in order to utilize primary bonding mechanisms of diffusion and adsorption. Methacrylate monomers, preferably methyl methacrylate monomer, may have a lower molecular weight, lower surface tension relative to Styrene. As such, a longer chain unsaturated polymer may be used to provide further bonding sites in order to reduce the amount of free acrylate or methacrylate monomers being trapped in the adhesive mass. It may be the case that without the inclusion of an additional long-chain unsaturated polymer to tie up or provide bond sites for free acrylate or methacrylate monomer, the monomer may become entrapped within the rising exothermic cure matrix resulting in boiling which may cause gas/vapor pockets, as seen in larger or thicker applications of adhesive. Further, other long chain reactive or unsaturated polymer or polymer blends such as epoxy resin, polyurethane resin, including urethane acrylate and urethane methacrylate resin in combination with polyester alkyd or methyl methacrylate-polyester resin and acrylate or methacrylate ester monomers may be included to further tie up free acrylate or methacrylate monomer in the inventive adhesive composition which may provide similar reduced boiling tendencies and bonding characteristics as an all polyester-acrylate-methacrylate composition. The unsaturated reactive polymers may be found in the inventive adhesive composition in an amount from about 0.5-30% by weight (more preferably from about 2.5-25% by weight).

The inventive adhesive composition may further include an impact modifier (e.g. a core/shell impact modifier) to thicken the adhesive as well as provide some degree of toughness. The impact modifier may be a graft copolymer of methacrylate butadiene styrene that swells but does not dissolve in monomer, available as Paraloid BTA-753 from Dow Chemicals and/or Kane Ace 637 available from Kaneka Corporation. The impact modifier may be found in the inventive adhesive composition in an amount from about 2.0-30% by weight (more preferably from about 5-25% by weight).

The inventive adhesive may be cured by means of a free radical addition polymerization mechanism. This mechanism may be achieved through different curing systems based on a single or combination of reducing agents and a catalyst/initiator to initiate the polymerization process. The inventive adhesive may be a two-component system that may be packaged with the catalyst incorporated in one component and the reducing agent in the other component. The selection of a reducing agent/initiator may impact the final adhesive properties, particularly the working time, exotherm generated, cure hardness, tensile, shear and compressive properties.

Reducing agents preferred for this inventive adhesive may include derivatives of toluidines, anilines, aldehyde-amine condensate reaction products, and substituted aniline and toluidines. The reducing agent may be found in the inventive adhesive composition in an amount from about 0.007-5% by weight. A preferred reducing agent includes N,N-dimethylaniline (DMA—$C_8H_{11}N$), N,N-dimethyl-p-toluidine (DMPT—$C_9H_{13}N$), and n-phenyl-2-propyl-3-5-diethyl-1,2-dihydropyridine (DHP—$C_{15}H_{25}N$). Most preferred is N,N-dihydroxethyl-p-toluidine (HET—$C_{11}H_{17}NO_2$).

The initiator may be an oxidizing agent (e.g. organic hydroperoxide or organic peroxide). The initiator may be found in the inventive adhesive composition in an amount from about 0.1-3% by weight. Preferred initiators for the inventive adhesive may include dibenzoyl peroxide available commercially as a solid or 40 to 55 percent emulsified paste form, cumene hydroperoxide (CHP), and tert-butyl perbenzoate (TBPB).

A first component (hereinafter referred to as "Component A") of the inventive adhesive composition may be reacted with a second component (hereinafter referred to as "Component B") of the inventive adhesive. In one embodiment, Component A may have a cure system based on aniline and toluidine as reducing agents and Component B may contain dibenzoyl peroxide. In a second embodiment, Component A may have a cure system based on an aldehyde amine-condensate including n-phenyl-2-propyl-3-5-diethyl-1-2-dihydropyridine and Component B may contain cumene hydroperoxide and/or tert-butyl perbenzoate. In a third embodiment, Component A may be cured with pyridine/hydroperoxide cure system and may further contain a sulfur bearing compound such as p-toluenesulfonyl chloride.

The inventive adhesives may further include inhibitors and/or antioxidants to stabilize the adhesive thereby extending the storage shelf life of the product. The unsaturation in the acrylate and methacrylate ester monomers, the long chain unsaturated resins and elastomers may react in the presence of heat or from contamination from additives to initiate the polymerization process. To prevent premature polymerization, free radical scavenger inhibitors and antioxidants derived from phenols and quinones and their derivatives may be incorporated. Although the monomers, elastomers and/or resins may contain some limited amounts of inhibitors and/or antioxidants, additional amounts of inhibitors and/or antioxidants may be required to effectively prolong the stability of the inventive adhesive. Exemplary inhibitors include, but are not limited to hydroquinone, and toluhydroquinone. An exemplary antioxidant includes, but is not limited to butylated hydroxyl toluene (BHT). The inhibitors may be found in the inventive adhesive composition in the amount of about 0.0005-1.0% by weight, and the antioxidants in the inventive adhesive composition in the amount of about 0.05-2% by weight.

The invention may further contain a chelating agent. An Exemplary chelating agent includes, but is not limited to ethyelene diamine tetraacetic acid tetrasodium salt. The chelating agent may act as metal scavenger further stabilizing the adhesive. This chelating agent may be dissolved in water and an alcohol, which may act as a carrier solution prior to incorporating into the adhesive composition. The chelating agent may be found in the inventive adhesive composition in an amount from about 0.005-0.5% by weight.

The invention may further contain an adhesion promoter to improve adhesion to metals. Exemplary adhesion promoters include, but are not limited to, unsaturated phosphate ester monomers. More specifically, the adhesion promoter may include those sold under the trade name Sipomer PAM-100 and Pam 200 by Rhodia, Light Ester PM-1 and PM-2 by Kyoeisha Chemicals Company, and Sartomer CD 9052 or CD9053 by Sartomer. The adhesion promoter may be found in the inventive adhesive composition in an amount from about 0.005-5% by weight The inventive adhesive composition may be further optimized by the inclusion of one or more filler compositions to enhance specific properties including: reduced exotherm, boiling, shrinkage, print through, cost, increased shear properties, hardness, etc. The filler composition may include one or more inorganic or polymeric-type fillers including, but not limited to PVDC light-weight filler, diatomaceous silicas, chopped glass, powdered aluminum, aluminum oxide, aluminum trihydrate, silica, calcium carbonate and talc etc.—The inventive adhesive composition can further consist of filled and non-filled adhesive composition of both 1:1 and 10:1 mix ratio formulations.

The inventive adhesive composition may be formulated for bonding variously sized assemblies. Large assemblies may require longer open times than smaller assemblies. The invention is optimized to exhibit both short and long working times, covering a range of 2 minutes to 120 minutes at room temperature (75° F.) while curing in thin and thick bond gaps and providing improved adhesion to thermoset composites, thermoplastics and/or metal adherends. The Component A and Component B of the inventive adhesive may be separately maintained in either cartridges or in closed containers of varying volumes. Most preferred are polypropylene, Polyester (PBT) and nylon cartridges in 50 mls, 200 mls, 380 mls, 490 mls and 880 mls sizes. The bulk storage may be in polypropylene, polyethylene, polyester, nylon and lined steel drums in varying volumes. The two components are mixed either by hand or through a mixing device prior to bonding adherends.

The finished adhesive composition may be composed primarily of an elastomer and polymers dissolved in an acrylate and/or methacrylate monomer, and further processed into paste using combination of thickeners such as fumed silica and core/shell graft copolymer commonly known as an impact modifier. Impact modifiers typically swell but do not dissolve which can improve non-sagging and toughness properties.

Inclusion of unsaturated polyester alkyds in inventive adhesive may enable the cross-linking of the volatile free acrylate/methacrylate monomers during the free radical reaction process, especially in large masses or thick cross sections, thus reducing the formation of voids caused by boiling and out gassing of the free acrylate or methacrylate monomer.

Further improvements in bonding to metals may result from the selection of elastomers that have higher electrostatic attractions to metals to improve the broader range of adhesion capabilities. Preferred elastomers are ones that remains highly electronegative after curing or cross-linking.

Still further, it may be the case that the use of higher molecular weight monomers can reduce sliding in large applications on vertical surfaces due to the fact that they don't exhibit as good surface wetting and diffusion properties as compared to lower surface tension acrylate and or methacrylate monomers. In order to compensate for the improvements to adhesion properties, thickeners such as impact modifier and fumed silica are used to increase thickness and reduce sliding tendency. Relative specifically to a large segment of applications of adhesive to the B side of open molded FRP parts. The sliding can be minimized or significantly reduced with a higher fiber prominent surface.

The inventive adhesive composition employs low molecular weight monomer with low surface energy discussed prior in combination with polychloroprene elastomer, polyester alkyd vinyl ester alkyd, or polyester or vinyl ester alkyds further dissolved in acrylate and or methacrylate monomer, additives, acid and core/shell impact modifier to provide improved features including retention of cure in both thin and thick bonding gaps and best adhesion to a broad variety of adherends.

By formulating a free radical polymerizable, two-component methacrylate adhesive system, based on the following product platform the inventive adhesive composition may best utilize all four bonding mechanisms for adhesion discussed prior, thereby providing improved adhesive platform that is more versatile in its ability to bond similar or dissimilar substrates (metals and most thermoset and thermoformed plastics) with excellent adhesion/shear strength properties, in smaller thinner applications and also exhibiting the ability to bridge larger gaps approaching 1" without monomer boil or outgassing.

Series I adhesive solutions presented herein are designed to compare adhesion properties of elastomeric polymers that are commonly used in formulating methacrylate adhesives. These elastomers are notably low modulus with low glass transition temperature (Tg). Elastomers that cross-link with low electron affinity demonstrate poor adhesion to metals but are not impacted by adhesion to composites and plastics. The fact that one or more low molecular weight or low surface energy monomers may be used as part of formulations may still enable a mechanisms of adsorption and/or diffusion of infused fibre-reinforced polyester (FRP) composite or polyvinyl chloride (PVC) plastic, thereby showing acceptable adhesion qualities if the adhesive is being evaluated only FRP, since all examples in Series I exhibit fiber tear to FRP composite. In addition, elastomeric polymers may be incorporated to provide toughness to the adhesive compositions. For the example solutions, we are primarily interested in unsaturated halogenated elastomers which exhibit high electronegativity after cure, which results in improved bonding of the inventive adhesive to metal adherend's. Exemplary elastomers should be soluble in methacrylate and/or acrylate monomers such as polychloroprene (Neoprene AD-20, WB and WM-, made by Dow Chemicals). Other exemplary soluble elastomers included in the examples are block copolymers of linear or radial styrene-butadiene-styrene copolymers (Kraton D1155 Made by Kraton Polymers), a linear or radial styrene-isoprene-styrene copolymers, liquid or solid nitrile elastomers (Nipol DN401LL Made by Zeon chemicals), butadiene-acrylonitrile polymers, chlorinated polyethylene (supplied by Lianda), chlorosulfonate polyethylene (Hypalon-Made by Tosoh). These elastomers are further compared in subsequent solutions in Series II and III.

Series II and Series III adhesive solutions compare lower surface tension monomer methyl methacrylate to three other higher surface tension monomers lauryl methacrylate, tetradecyl methacrylate and vinyl benzene and their effect on adhesion to metals and plastics are examined. These higher molecular weight monomers may reduce boiling or exothermic outgassing of adhesive compositions in large applications where thicker gaps are prevalent up to 1" thick. These higher molecular monomers are shown in comparison to embodiments of the inventive composition comprised of long chain unsaturated polyester polymer alkyds which likewise, cross-link with lower surface tension reactive monomers and allow for thicker adhesive applications up to 1" (compared in Series II and III).

Impact modifiers-employed to thicken adhesives into a paste that resist sagging in large applications and also provide toughness and impact strength may include graft copolymers that swell in methacrylate and/or acrylate monomers but do not dissolve. Examples of such impact modifiers include PARALOID® BTA-753 from Rohm and Haas Company used in all solutions (Series I, II and III).

Reducing agents may initiate the polymerization process in the presence of an initiator. Therefore, reducing agents and initiators may be kept separated from each other in either Component A or Component B. In one embodiment, the polymerization process may be achieved through different curing systems based on a single or combination of reducing agents and a catalyst/initiator to initiate the free radical cure reaction. In the adhesive solutions, two reducing agents, N,N-bis(2-hydroxyethyl)-p-toluidine (HET) and N,N-dimethyl-p-toluidine (DMPT) may be used in a 10:1 ratio with respect to an initiator peroxide catalyst. In another embodiment, component A solution (Series III-C) contained reducing agents based on aldehyde-amine condensate reaction products (Reilly PDHP) and further containing a sulfur bearing compound p-toluenesulfonyl chloride may be reacted in a 1:1 ration with a Hydroperoxide (Cumene Hydroperoxide) as initiator.

Initiators used in the Component B activator solutions may be made from a 50% dibenzoyl peroxide emulsion in proprietary plasticizer, an impact modifier of a graft copolymer of ethyl acrylate and methyl methacrylate, Kane Ace FM-41 (Made by Kaneka Corporation) dissolved in Benzoflex, a 9-88 benzoate ester plasticizer referenced as activator (ACT) 1 (Component B) throughout invention. Component B may be formulated to be mixed at a ratio of 10 parts Component A and 1 part Component B. Component A adhesive may contain the reducing agent and Component B may contain the initiator. This same activator ACT 1 (Component B) was used to react with all adhesive solutions except Series III-C. A separate mix ratio of 1:1 of components A:B to illustrate the preferred embodiments will work equally well in this mixing ratio is illustrated in Series III-C solutions, in which the initiator cumene hydroperoxide (CHP) is incorporated into Component B of an adhesive solution to react with Component A adhesive solution containing reducing agent such as aldehyde amine-condensate including n-phenyl-2-propyl-3-5-diethyl-1-2-dihydropyridine further containing a sulfur bearing compound such as p-toluenesulfonyl chloride.

The selection of an inhibitor package for adhesive is generally proprietary to those skilled in the art and often specific to each formulated product. Inhibitors and/or antioxidants may be used to stabilize the adhesive solutions thereby extending the storage shelf life of the product. To prevent premature polymerization, free radical scavenger inhibitors and antioxidants derived from phenols and quinones such as butylated hydroxyl toluene (BHT), 1,4-naphthaquinone are used in the inventive adhesive composition in the amount of about 0.0005-2% by weight.

Acid-functional monomers, typically ethylenically unsaturated C3 to C6 monobasic or dibasic carboxylic acids, such as acrylic acid, methacrylic acid, itaconic acid, crotonic acid, maleic acid and/or fumeric acid, and other unsaturated carboxylic acids, when used, can function as adhesion promoters. Such acids, when used, generally constitute at least about 0.1-10 weight percent of the adhesive, typically about 0.2-7 weight percent of the adhesive, and more typically about 0.5-5 weight percent of the adhesive. The primary function is to improve adhesion. In the inventive adhesive, methacrylic acid (MAA, Made by Evonik Industries AG) was used in all solutions (Series I, II and III). Maleic acid (MA, Made by Eastman Chemicals) was added in a lesser amount in Series III-C (1 to 1 mix ratio example).

In addition to examples containing MAA and MA for improved overall adhesion to plastics and composites, unsaturated phosphorus containing acid ester monomer (Sartomer CD9053) have been added equally across all component A adhesive solutions to improve adhesion performance. There are other unsaturated phosphate-containing monomers that can be used as substitute for CD9053 for the same effect, including, Sipomer PAM-100, PAM-200 (Made by Rhodia), Ebercryl 168 (Made by Cytec), and Light ester PM-1 and PM-2 (Made by Kyoeisha Chemicals Co.)

The adhesive compositions may include one or more other additives such as, chain transfer agents, transition metals salts, including organometallic compounds such as copper acetylacetonate and cobalt octoates, chelating agents such as tetrasodium salt of ethylene diamine tetraacetic acid as scavenger for trace metals, natural or synthetic was such as paraffin wax to control monomer loss and air inhibition, other types of adhesion promoters, plasticizers, fillers, thickeners, impact modifiers or other, pigments, UV protectors, wetting agents, colorants, reinforcement fibers, etc.; however, most of this may not be required and could be excluded by those experienced in the art.

Raw materials utilized throughout the three different series of examples are outlined in TABLE 1

TABLE 1

RAW MATERIALS AND COMPONENTS

| RAW MATERIAL | Function | Supplier |
| --- | --- | --- |
| Methyl Methacrylate Monomer | MMA- Commonly available low surface energy monomer | Evonik Ind. AG |
| Lauryl Methacrylate | LMA- Higher MW methacrylate, higher surface energy monomer | Sartomer Company Inc. |
| Tetradecyl Methacrylate | TDMA- Higher MW methacrylate, higher surface energy monomer | Sartomer Company Inc |
| Vinyl Benzene (Styrene) | Styrene- Higher MW reactive monomer, with high surface energy | North American Composites |
| DCPD unsaturated polymer | 100% solids DCPD Unsaturated long chain polymer, polyester alkyd economical grade 1 | Reichhold, Inc. Piedmont Chemicals, Inc. |
| Orthophthalic unsaturated polymer | 100% solids Unsaturated long chain polymer, polyester alkyd economical grade 2 | Reichhold, Inc Piedmont Chemicals, Inc. |
| Polychloroprene AD Grade | Elastomer, unsaturated and halogenated- Neoprene AD-20 | DuPont-Dow Elastomers |
| Polychloroprene WB Grade | Elastomer, unsaturated and halogenated- Neoprene WB Grade | DuPont- Dow Elastomers |
| Nitrile reactive elastomer | Elastomer, liquid or solid nitrile elastomer- Nipol DN401LL or DN4555 | Zeon Chemicals |
| Chlorinated Polyethylene | Elastomer, saturated- halogenated polyethylene polymer | Lianda |
| Nova NAS 30 | Styrenic polymer | Nova Chemicals |
| Impact modifier | Impact Modifier thickener- Paraloid BTA-753 | Rohm and Haas Company |
| Impact modifier | Impact Modifier thickener- Kane Ace FM-41 | Kaneka Corp. |
| N,N-dimethyl-p-toluidine (DMPT) | Tertiary Aniline (Reducing agent) | First Chemicals |
| Methacrylic Acid | MAA-Acid adhesion promoter | Evonik Ind. AG |
| Maleic Acid | MA-Acid adhesion promoter | Aceto Corporation |
| Unsaturated phosphoric acid ester | Metal adhesion promoter unsaturated phosphate ester- SR9053 | Sartomer Company Inc. |
| Hydroxyethyl toluidine (HET) | Purified Dihydropyridine (PDHP) | Reilly Industries Inc. |
| IGI 1977 Wax | Paraffin Wax | International Corporation |
| 1,4-Naphthaquinone (NQ) | Inhibitor | Sigma-Aldrich |
| p-Toluenesulfonyl Chloride | Catalyst | Sigma-Aldrich |
| Butylated Hydroxytoluene (BHT) | Hindered phenol (antioxidant) | Albemarle Corporation |
| Fumed Silica | Fumed Silica- Thickener, Konasil 200 | Lintech International |
| Benzoflex 9-88 (Benzoate Ester) | Plasticizer | Univar Corporation |
| Cumene Hydroperoxide (CHP) | Initiator (Hydroperoxide) | Syrgis |
| 50% BPO Paste (Benox B-50) | Initiator (peroxide) | Syrgis |
| 0.05% Copper acetylacetonate | Metal salt accelerator | Sigma-Aldrich |

The following procedures were used to formulate the Adhesives and Activators in accordance with the invention:

Preparation of Adhesive Examples I, II & III

First, premix or stock solutions of the various elastomers used in the adhesive examples (i.e. component "A") were prepared in a ten-gallon double planetary high shear mixer made by Charles Ross and Sons Company. The amount of each elastomer in each premix solution varies and is dependent on solubility parameters. The breakdown is as follows:

Neoprene WB—30%, methyl methacrylate monomer (MMA)—70%

Neoprene AD-20 (milled)—25%, MMA—75%

Nipol DN401LL—25%, MMA—75% by wt.

Nipol DN4555—25%, MMA—75% by wt.

Chlorosulfonated Polyethylene—30%, MMA—70% by wt.

Kraton D1155—40%, MMA 60%, by wt.

Nova NAS 30-40%, MMA 60%, by wt

The premix preparation process may begin by adding the methacrylate monomer to the mixer. This may be followed by adding very slowly the elastomers under moderate mixing to avoid clumping. After the elastomer is completely added to the monomer, the charge pot lid may be closed and the cooling system on the mixer turned on to avoid monomer loss. The speed of agitation may be adjusted higher with built in viscosity, and the mixing may continue until the elastomer is fully dissolved. Once dissolved, the premix solution may be cooled to room temperature before been packaged into appropriate plastic container with pourable lid. All other ingredients may be combined by direct addition and mixed with a high shear lab mixer until a homogenous paste is obtained. Each blended example was rapidly cooled in chilled water to room temperature to control monomer loss.

The activator component (component B, ACT 1) was made by mixing together benzoate ester plasticizer (Benzoflex 9-88) and the Kane Ace FM-41 core/shell impact modifier in the double planetary mixer. The batch may be cooled and BPO peroxide (Benox B-50) added. The batch may be degassed and packaged into appropriate plastic containers with pourable spout.

The activator component B was then added to the adhesive component A at a mix ratio of 10:1 for all examples except for Series III-C prior to bonding or testing properties. Ten adhesives were prepared in SERIES I examples, nine adhesive samples in SERIES II examples and eight adhesive samples in SERIES III examples.

Adherends used along with brief description are listed in TABLE 2:

TABLE 2

Adherends Utilized and Descriptions

| Material Designation | Description |
|---|---|
| CRS | AISI 1020 Cold Rolled Steel |
| AL | Aluminum 6061-T6 |
| SS | Stainless Steel 304 |
| PVC | Polyvinyl Chloride rigid Sheet .25 in |
| FRP-Infused | Fiber reinforced polyester laminate (Infusion process-introduce polyester resin into reinforcements under vacuum bag for consistent surface) |

Physical test methods used and short descriptions are listed in TABLE 3. It will be noted that all bonded examples allowed minimum 72 hours room temperature (75° F.) cure prior to testing. The metal bonded specimens were prepared by mixing the adhesive component A and activator component B in a ratio of 10:1 (except later in Series III 3C, where mix was based on 1:1 ratio) and placed on either grit blasted, solvent cleaned, cold rolled steel (CRS) or bonded to aluminum type 6061-6 and stainless steel type 304 strips that were only solvent cleaned. All metals strips were pre-cut at 1×4 inch in dimension and assembled metal to metal with 0.5×1 inch overlap configuration in a stainless steel mold, designed to maintain specific bond line thickness at 0.010 inch. Bonded metal strips were tested according to ASTM D1002 at a crosshead pull rate of 0.05 inch per minute.

For the FRP and thermoplastic (PVC) specimens, a 1-inch overlaps were used at a bond gap of 0.125 inch for the FRP specimens, and 0.03 inch for the thermoplastic PVC specimens. In order to achieve a uniform spread of adhesive between mating parts, 0.125 inch metal shims were used as spacers for FRP specimens and 0.03 inch glass beads for PVC plastic specimens. This insured an acceptable bond thickness and specimen to specimen consistency. The FRP specimens were tested according to ASTM 5868 at a crosshead pull rate of 0.5 inch per minute, and the plastics were tested according to ASTM 2564. All bonded specimen were conditioned at room temperature (75° F.) for 72 hours prior to testing.

TABLE 3

Physical Testing Methods and Descriptions

| Physical Test Method | Description | Adhesive thickness |
|---|---|---|
| ASTM D1002 Lap Shear | Tensile Lap Shear Strength on Metals .5" overlap exception- pulled at .05"/min | .010" |
| ASTM D2564 Compressive Shear | Compressive Shear Strength best utilized on PVC plastic coupons run at .25"/min | .030" |
| ASTM D5868 Lap Shear | Single Lap Shear for FRP Composites 1" overlap pulled at .5"/min | .125" |
| Exothermic Boiling-Observation | Adhesive observation of outgassing testing at approximately 1" diameter mass by 6" long | 1.0" |
| Shore D Hardness | 24 hour room temperature cured measured hardness of cross section thick 1.0" and thin ⅛" bead thickness. | 1.0" thick .125" thin |

Each test sample was identified according to the "failure mode" it exhibited. Cohesive Failure (COH) represented that a thin or equal layer of adhesive stayed on one surface of the specimen and the other surface of the specimen had the rest of the cured adhesive. Cohesive failure represents desired failure mode providing it is not also a result of less than desired strength. Cohesive failure is more predictable when realized on metal or plastic surfaces and indicative of excellent adhesion. Adhesive Failure (ADH) represented that the cured adhesive released cleanly from one of the surfaces when the load was applied. Adhesive failure is not desired for any adhesive for any reason, since this mode of failure cannot be predicted or counted on for long-term bond durability. Another failure mode (MIX) representing a part cohesive/adhesive. Again having some adhesive failure is not desired. Other modes of failure relevant to FRP or PVC could be used to describe failure (fiber tear, deep fiber tear or substrate failure), but for our illustrations since all formulations contain some level of MMA, we didn't expect any of the adhesive examples to exhibit clean Adhesive Failure on these two non-metal surfaces, so were mainly looking for comparison in shear strength on these adherends, relative to the effects the non-preferred monomers have on ultimate bond strength.

In Series I examples 1A through 1J illustrates adhesion properties of the various elastomer adhesives compared to polychloroprene the preferred elastomer of the present invention, including but not limited to adhesive bonding capabilities to FRP composite that was infused with polyester resin, PVC very commonly bonded type thermoplastic and metal strips of AL and CRS. The tests conducted were single lap-shear adhesion test based on ASTM methods described in Table 3. The non-preferred elastomers that cross-link with lower electron affinity are shown independently in examples 1C-1F to demonstrate lower or inconsistent results on metals, especially on CRS compared with neoprene. The fact that all examples were blended with preferred MMA monomer (low surface energy monomer), which was used across all Series I examples, best enables the mechanism of adsorption. Also, due to the low molecular weight of MMA relative to higher molecular weight monomers further exhibits better diffusion on infused FRP composite or PVC plastic, thereby showing acceptable adhesion qualities. If we only looked at FRP, then the examples would be harder to decide which is better, since they all exhibited some level of fiber tear on FRP composite.

Examples in Series I compares the shear properties of representative prior art and commercial structural methacrylate adhesives including blends thereof with those of the present invention just on the basis of changing elastomers. Comparative examples are examples 1C, 1D, 1E, 1F, 1G, 1H, 1I and 1J and inventive adhesive example is 1A and 1B.

| EXAMPLES (SERIES IA-IE) | | | | | |
|---|---|---|---|---|---|
| RAW MATERIAL | 1A | 1B | 1C | 1D | 1E |
| Methyl Methacrylate Monomer | 62.5 | 62.5 | 62.5 | 62.5 | 62.5 |
| Methacrylic Acid | 5 | 5 | 5 | 5 | 5 |
| Neoprene AD-20 (18%) | 12 | | | | |
| Neoprene WB (25%) | | 12 | | | |
| Nipol DN401LL (25%) | | | 12 | | |
| Chlorinated Polyethylene (Tyrin) | | | | 12 | |
| Chlorosulfonate Polyethylene (30%) | | | | | 12 |
| Kraton D1155 (40%)) | | | | | |
| Paraloid BTA-753 | 20 | 20 | 20 | 20 | 20 |
| Hydroxyethyl toluidine (HET)-25% | 0.5 | 0.5 | 0.5 | 0.5 | 0.5 |
| ADH | 90 | 90 | 90 | 90 | 90 |
| Benzoflex 9-88 | 60.5 | 60.5 | 60.5 | 60.5 | 60.5 |
| Kane Ace FM-41 | 12.5 | 12.5 | 12.5 | 12.5 | 12.5 |
| Benox-B 50 | 27 | 27 | 27 | 27 | 27 |
| ACT 1 | 10 | 10 | 10 | 10 | 10 |
| Test Properties | | | | | |
| AL Maximum Shear Strength (psi) | 3505.26 | 3707.20 | 3491.35 | 3839.62 | 3547.54 |
| Failure Mode (AD/COH/MIX) | COH | COH | COH | COH | COH |
| CRS Maximum Shear Strength (psi) | 3432.11 | 3179.43 | 2356.38 | 1640.36 | 698.62 |
| Failure Mode (AD/COH/MIX) | COH | COH | MIX | MIX | ADH |
| FRP Infused Shear strength | 1227.65 | 1053.68 | 932.03 | 1176.04 | 633.87 |
| PVC Shear strength | 2246.02 | 2250.70 | 1314.01 | 1286.75 | 1992.75 |

| EXAMPLES (SERIES IF-IJ) | | | | | |
|---|---|---|---|---|---|
| RAW MATERIAL | 1F | 1G | 1H | 1I | 1J |
| Methyl Methacrylate Monomer | 62.5 | 61.5 | 61.5 | 61.5 | 61.5 |
| Methacrylic Acid | 5 | 5 | 5 | 5 | 5 |
| Neoprene AD-20 (25%) | | 7.5 | | | |
| Neoprene WB (30%) | | | | | |
| Nipol DN401LL (25%) | | 7.5 | 7.5 | 7.5 | 7.5 |
| Chlorinated Polyethylene (Tyrin) | | | 7.5 | | |
| Chlorosulfonate Polyethylene (30%) | | | | 7.5 | |
| Kraton D1155 (40%)) | 12 | | | | 7.5 |
| Paraloid BTA-753 | 20 | 18 | 18 | 18 | 18 |
| Hydroxyethyl toluidine (HET)-25% | 0.5 | 0.5 | 0.5 | 0.5 | 0.5 |
| ADH | 90 | 90 | 90 | 90 | 90 |
| Benzoflex 9-88 | 60.5 | 60.5 | 60.5 | 60.5 | 60.5 |
| Kane Ace FM-41 | 12.5 | 12.5 | 12.5 | 12.5 | 12.5 |
| Benox-B 50 | 27 | 27 | 27 | 27 | 27 |
| ACT 1 | 10 | 10 | 10 | 10 | 10 |
| Test Property | | | | | |
| AL Maximum Shear Strength (psi) | 3785.98 | 3518.61 | 3820.78 | 3970.08 | 3931.09 |
| Failure Mode (AD/COH) | COH | COH | COH | COH | COH |
| CRS Maximum Shear Strength (psi) | 2986.68 | 2820.42 | 3041.77 | 3373.78 | 2839.77 |
| Failure Mode (AD/COH) | MIX | MIX | MIX | COH | MIX |
| FRP Infused Shear strength | 896.09 | 1220.53 | 1087.09 | 754.7289 | 987.48 |
| PVC Shear strength | 1730.35 | 1870.43 | 1112.25 | 1758.26 | 1184.92 |

The Series I examples show that, with respect to the single or independent elastomer blends of examples 1A, 1B, 1C, 1D, 1E and IF, the neoprene based inventive examples 1A and 1B exhibit the best all around properties compared to comparative example 1C (Nipol ND401LL), example 1D (Chlorinated polyethylene), example 1E (Chlorosulfonate polyethylene), and 1F (Kraton D1155 styrene-butadiene block copolymer). Interestingly, blends of these elastomers appear to show improvements over the single base blends but still not consistent across all adherends as the neoprene versions. Further, in inventive adhesive 1A and 1B, the total amount of elastomer is the same as that of comparative example 1C through 1F. It's also worth noting that inventive adhesive 1A and 1B did not exhibit adhesive failure to metals with consistent high strength COH failure, demonstrating improvements through electrostatic attractions. The examples 1A and 1B yielded higher strength on FRP and PVC substrates and the failure mode to FRP was a deep fiber tear, versus varied results for the comparative adhesives, regardless of the elastomer composition. FRP is one of the primary substrates commonly cited or used as reference for prior art improvements relating to boiling in thick gaps.

Series II looks at various higher surface tension monomers or higher molecular weight acrylate and methacrylate monomers and vinyl benzene (styrene) monomers. Also incorporated in this Series II are two types of polyester alkyds which are esterifcation reaction product of diethylene glycol, maleic anhydride and phthalic anhydride for the Orthophthalic version, and dicylopentadiene, diethylene glycol and maleic anhydride version for the DCPD (both supplied as 100% solids long chain unsaturated polymer alkyds). These two polyester alkyd further dissolved in part of the methyl methacrylate in the inventive adhesive examples are employed to reduce the boiling tendencies of the adhesive in large 1" thick curing masses while maintaining hardness in thin/thick beads and adhesion properties across a varied set of commonly bonded substrates. The properties of the inventive adhesive which are example 2A, 2B, and 2C are to be compared to prior art examples which are 2D, 2E, 2F, 2G, 2H and 2I.

| SERIES II EXAMPLES (SERIES II A-E) | | | | | |
| --- | --- | --- | --- | --- | --- |
| RAW MATERIAL | 2A | 2B | 2C | 2D | 2E |
| Methyl Methacrylate Monomer | 58.5 | 58.5 | 46 | 46 | 46 |
| Methacrylic Acid | 5 | 5 | 5 | 5 | 5 |
| Lauryl Methacrylate | | | 17.5 | | |
| Tetradecyl Methacrylate | | | | 17.5 | |
| Vinyl Benzene (Styrene) | | | | | 17.5 |
| DCPD Polyester Alkyd | 5 | | | | |
| Orthophthalic Polyester alkyd | | 5 | | | |
| Neoprene AD-20 | 13 | 13 | 13 | 13 | |
| Neoprene WB | | | | | |
| Nipol DN401LL | | | | | 13 |
| Chlorinated Polyethylene (Tyrin) | | | | | |
| Kraton D1155 (SBS Block Copolymer) | | | | | |
| Paraloid BTA-753 | 18 | 18 | 18 | 18 | 18 |
| Hydroxyethyl toluidine (HET) | 0.5 | 0.5 | 0.5 | 0.5 | 0.5 |
| ADH | 90 | 90 | 90 | 90 | 90 |
| Formulated ACT 1 | 10 | 10 | 10 | 10 | 10 |
| Comments | | | | | |
| Test Property | | | | | |
| AL-Shear Strength (psi) | 3849.86 | 3554.76 | 3063.36 | 3251.90 | 2612.05 |
| Failure Mode (AD/COH/MIXED) | COH | COH | MIX | MIX | ADH |
| CR Steel- Shear Strength (psi) | 3622.05 | 3096.80 | 2181.78 | 1625.95 | 38.17 |
| Failure Mode (AD/COH/MIXED) | COH | COH | ADH | ADH | ADH |
| PVC- Compressive Shear | 1719.49 | 1643.51 | 1342.34 | 910.22 | 1123.52 |

| SERIES II EXAMPLES (SERIES II F-I) | | | | |
| --- | --- | --- | --- | --- |
| RAW MATERIAL | 2F | 2G | 2H | 2I |
| Methyl Methacrylate Monomer | 44.00 | 44.00 | 46.00 | 46.00 |
| Methacrylic Acid | 5 | 5 | 5 | 5 |
| Lauryl Methacrylate | | | | |
| Tetradecyl Methacrylate | | | | |
| Vinyl Benzene (Styrene) | 17.5 | 17.5 | 17.5 | 17.5 |
| DCPD Polyester Alkyd | | | | |
| Orthophthalic Polyester alkyd | | | | |
| Neoprene AD-20 | 7.5 | | 13 | |
| Neoprene WB | | | | |
| Nipol DN401LL | 7.5 | | | |
| Chlorinated Polyethylene (Tyrin) | | 15 | | |
| Kraton D1155 (SBS Block Copolymer) | | | | 13 |
| Paraloid BTA-753 | 18 | 18 | 18 | 18 |
| Hydroxyethyl toluidine (HET) | 0.5 | 0.5 | 0.5 | 0.5 |
| ADH | 90 | 90 | 90 | 90 |
| Formulated ACT 1 | 10 | 10 | 10 | 10 |
| Test Property | | | | |
| AL-Shear Strength (psi) | 3687.58 | 3278.63 | 3844.27 | 3596.18 |
| Failure Mode (AD/COH/MIXED) | COH | MIX | COH | COH |
| CR Steel- Shear Strength (psi) | 57.69 | 21.89 | 15.43 | 1649.54 |
| Failure Mode (AD/COH/MIXED) | ADH | ADH | ADH | ADH |
| PVC- Compressive Shear | 1300.54 | 1437.24 | 1052.15 | 780.72 |

The results in Series II illustrate improvements in examples 2A and 2B, for shear strength and failure modes on CRS bonded specimens through the utilization of polyester alkyds to adhesives containing polychloroprene, methyl methacrylate and MBS impact modifier as opposed to the comparative example adhesives that contain lauryl methacrylate, dodecyl methacrylate and styrene monomers.

Comparative example 2C through 2I are all similar to inventive example 2A and 2B, except part of the monomer package has been replaced with higher boiling point and surface tension monomers with the intent of controlling boiling in larger dispensed adhesive beads. Further comparisons in Series III (3E and 3F) compare example adhesives using nitrile elastomers in conjunction with styrene monomer and/or further with unsaturated polyester resins comprising mixtures of styrene and polyester or vinyl ester alkyds to reduce boiling in prior art compositions.

In the final set of examples Series III, all the elements of the improved adhesive composition were incorporated to verify the performance compared with other comparative examples. The inventive adhesives examples are 3A, 3B, 3C and 3D, and the comparative examples are 3E, 3F, 3G and 3H. The inventive adhesive example 3C is essentially the same in composition as inventive examples 3A, 3B and essentially 3D, except the cure system is based on pyridine/hydroperoxide commonly used in a 1:1 component A:component B mix ratio adhesive versus aniline/peroxide commonly used in 10:1 component A:component B mix ratio type adhesives. Results for example 3A, 3B, 3C and 3D illustrates that using an unsaturated polyester alkyd with an all low surface energy monomer provides an improvement to comparative examples by providing a more thorough or complete cure in both thick and thin cross-sectioned hardness examples, while eliminating boiling in thicker applications up to 1" and most importantly not adversely affecting the adhesion across multiple substrates. Again the inventive adhesives demonstrate that across multiple metal surfaces to have excellent strength and consistently yield in a cohesive manner. Also PVC plastic adhesion was compared to 3B and 3C both mix ratio chemistries examples of 1:1 and 10:1 types of inventive formulation were compared to 3E-31 and the results show higher shear strength. The results in example 3C further illustrates that the pyridine/Hydroperoxide cure system exhibits similar properties as 3B in the aniline/peroxide examples with the inventive composition.

SERIES III EXAMPLES (SERIES III A-D)

| RAW MATERIAL | 3A | 3B | 3C | 3D |
|---|---|---|---|---|
| Methyl Methacrylate Monomer | 55.745 | 55.745 | 52.605 | 55.495 |
| Methacrylic Acid | 4.00 | 4.00 | 4.00 | 4.00 |
| Lauryl Methacrylate | | | | |
| Tetradecyl Methacrylate | | | | |
| Vinyl Benzene (Styrene) | | | | |
| DCPD Polyester Alkyd | 5.00 | 5.00 | 5.00 | |
| Orthophthalic Polyester alkyd | | | | 5.00 |
| Neoprene AD-20 | 4.00 | 4.00 | 4.00 | 4.00 |
| Neoprene WB | 14.00 | 14.00 | 14.00 | 14.00 |
| Nipol DN401LL or DN4555 | | | | |
| Chlorinated Polyethylene (Tyrin) | | | | |
| Nova NAS 30 | | | | |
| Paraloid BTA-753 | 15.000 | 15.000 | 14.745 | 15.000 |
| DMPT | | 0.75 | | 1.00 |
| Phosphate Ester (CD9053) | 1.00 | 1.00 | 1.00 | 1.00 |
| Hydroxyethyl toluidine (HET) | 0.75 | | | |
| IGI 1977 Wax | 0.50 | 0.50 | 0.50 | 0.50 |
| 1,4-NQ | 0.005 | 0.005 | | 0.005 |
| p-Toluenesulfonyl Chloride | | | 0.80 | |
| Butylated Hydroxytoluene (BHT) | | | 0.50 | |
| Maleic Acid | | | 0.750 | |
| Fumed Silica | | | | |
| ADH | 90 | 90 | | 90 |
| ACT 1:1 system | | | | |
| Cumene Hydroperoxide (CHP) | | | 0.5 | |
| Aldehyde amine (Reilly PDHP) | | | 1.00 | |
| 0.05% Copper acetylacetonate | | | 0.10 | |
| ACT 1 | 10 | 10 | | 10 |
| TEST PROPERTIES | | | | |
| AL- Shear Strength | 3687.36 | 3489.16 | 3704.94 | 3929.82 |
| Failure Mode (AD/COH/MIX) | COH | COH | COH | COH |
| CRS- Shear Strength | 2810.23 | 3128.74 | 3210.4 | 3041.22 |
| Failure Mode (AD/COH/MIX) | COH | COH | COH | COH |
| SS- Shear Strength | 3226.3 | 3276.5 | — | 2737.34 |
| Failure Mode (AD/COH/MIX) | COH | COH | | COH |
| PVC- Compressive Shear | — | 1542.40 | 1759.63 | — |
| Cured Hardness cross section at .125 in | 74-78 | 66-70 | 76-80 | 74-78 |
| Degree of hardness cross section at 1 in | 64-68 | 64-68 | 68-72 | 64-68 |
| Boiling in thick gap 1" × 6" application 4 best- no boiling | 4 | 4 | 4 | 4 |

SERIES III EXAMPLES (SERIES III)

| RAW MATERIAL | 3E | 3F | 3G | 3H |
|---|---|---|---|---|
| Methyl Methacrylate Monomer | 52.995 | 53.307 | 47.345 | 50.495 |
| Methacrylic Acid | 4.00 | 1.50 | 4.00 | 4.00 |
| Lauryl Methacrylate | | 1.50 | 10.00 | |
| Tetradecyl Methacrylate | | | 5.00 | |
| Vinyl Benzene (Styrene) | 5.00 | 5.00 | | 5.00 |
| DCPD Polyester Alkyd | | | | 5.00 |
| Orthophthalic Polyester alkyd | 5.00 | 5.00 | | |
| Neoprene AD-20 | | | 11.40 | 4.00 |
| Neoprene WB | | | | 14.00 |
| Nipol DN401LL or DN4555 | | 7.50 | | |
| Chlorinated Polyethylene (Tyrin) | 12.50 | | | |
| Nova NAS 30 | | 4.80 | | |
| Paraloid BTA-753 | 18.000 | 18.000 | 20.000 | 15.000 |
| DMPT | 1.00 | | 0.75 | 1.00 |
| Phosphate Ester (CD9053) | 1.00 | 1.00 | 1.00 | 1.00 |
| Hydroxyethyl toluidine (HET) | | 0.39 | | |
| IGI 1977 Wax | 0.50 | 0.50 | 0.50 | 0.50 |
| 1,4-NQ | 0.005 | 0.003 | 0.005 | 0.005 |
| p-Toluenesulfonyl Chloride | | | | |
| Butylated Hydroxytoluene (BHT) | | | | |
| Maleic Acid | | 1.50 | | |
| Fumed Silica | | | | |
| ADH | 90 | 90 | 90 | 90 |
| ACT 1:1 system | | | | |
| Cumene Hydroperoxide (CHP) | | | | |
| Aldehyde amine (Reilly PDHP) | | | | |
| 0.05% Copper acetylacetonate | | | | |
| ACT 1 | 10 | 10 | 10 | 10 |
| TEST PROPERTIES | | | | |
| AL- Shear Strength | 3031.56 | 3434.64 | 3332.16 | 1713.64 |
| Failure Mode (AD/COH/MIX) | COH | COH | MIX | COH |
| CRS- Shear Strength | 2953.06 | 2.51 | 2722.39 | 556.04 |
| Failure Mode (AD/COH/MIX) | COH | ADH | ADH | MIX |
| SS- Shear Strength | 2643.03 | 3235.22 | 2299.74 | 2914.01 |
| Failure Mode (AD/COH/MIX) | MIX | ADH | ADH | COH |
| PVC- Compressive Shear | 1464.95 | 1379.69 | 1348.87 | 985.60 |
| Cured Hardness cross section at .125 in | 64-68 | 74-80 | 72-76 | 42-46 |

-continued

| | | | | |
|---|---|---|---|---|
| Degree of hardness cross section at 1 in | 4-6 | 64-68 | 10-15 | 4-6 |
| Boiling in thick gap 1" × 6" application 4 best- no boiling | 4 | 4 | 4 | 4 |

Results of example 3A, 3B, 3C and 3D illustrate that the addition of polyester alkyd with an all low surface tension monomer such as methyl methacrylate and polychloroprene provides best adhesion properties to diverse adherends. This is evident by the bond strength and cohesive failure results achieved with the inventive adhesives to all bonded adherends in Series III. Most of the examples shows that adhesion to aluminum and for the most part across all examples in Series I, II and III are more difficult to distinguish one type of adhesive over another, however, the difference between the inventive adhesive and prior art examples is illustrated more clearly on adhesion to CRS and plastic-PVC in which the inventive adhesive consistently out performs the similar prior art examples.

Results further shows in comparative example 3E, 3F, 3G and 3H that the combination of higher and low molecular weight monomers with elastomers regardless of elastomer type, affects adhesion by reducing adhesives ability to wet and diffuse into plastics. Also these higher surface energy and/or higher molecular weight monomers reduced physical properties and the cured hardness of examples.

Inventive examples 3A through 3D further outperform the comparative examples in reaching a completed cure. The hardness results in varying cured bead thickness. Results show that the hardness of all examples is acceptable in thin beads (0.125 inch), which do not generate substantial heat or enough mass to accelerate reaction rate to cause potential side reaction, such as monomer-monomer cross-linking, which affects hardness. Surprisingly, the invention has determined that the use of methyl methacrylate with less amount of polyester alkyd versus the amount of higher molecular weight monomers used in prior arts, exhibits minimal to no boiling in larger dispensed beads with little effect on cure hardness. It is determined also that the cured hardness of the comparative adhesives, example 3E, 3G and 3H are drastically reduced with increase in adhesive mass compared to inventive adhesive 3A through 3D. In 3F, hardness was still shown to be affected similarly relative to thin section hardness.

It is believed that the present invention and many of its attendant advantages will be understood by the foregoing description. It may be also believed that it will be apparent that various changes may be made in the form, construction and arrangement of the components thereof without departing from the scope and spirit of the invention or without sacrificing all of its material advantages. The form herein before described being merely an explanatory embodiment thereof. It may be the intention of the following claims to encompass and include such changes.

What is claimed:

1. An adhesive composition comprising:
    at least one of an alkyl acrylate monomer and a methacrylate monomer; and
    at least one unsaturated polymer including at least one of an unsaturated polyester polymer or a vinyl ester polymer,
    wherein the adhesive composition is free from monomers have a surface tension greater than 28.5 dynes at 20° C.

2. The adhesive composition of claim 1, wherein the at least one of an alkyl acrylate monomer or methacrylate monomer has a surface tension energy less than about 28.5 dynes/cm at 20° C.

3. The adhesive composition of claim 1, wherein the at least one of an alkyl acrylate monomer and methacrylate monomer includes a $C_1$ to $C_6$ monomer with a surface tension energy of less than about 28.5 dynes/cm at 20° C.

4. The adhesive composition of claim 1, wherein the at least one unsaturated polymer comprises includes:
    at least one esterifcation reaction product of one or more saturated or unsaturated polycarboxylic or dicarboxylic acids and one or more polyhydric or dihydric alcohols.

5. The adhesive composition of claim 1, wherein the unsaturated polymer comprises includes:
    at least one of an orthophthalic polyester and a dicyclopentadiene polymer.

6. The adhesive composition of claim 5, wherein the at least one orthophthalic polyester includes:
    a reaction product of one or more glycols and one or more acids.

7. The adhesive composition of claim 6, wherein the one or more glycols are selected from a group including: diethylene glycol, ethylene glycol, dipropylene glycol, propylene glycol, neopentyl glycol, and 1,3-propanediol.

8. The adhesive composition of claim 6, wherein the one or more acids are selected from a group including: maleic anhydride, phthalic anhydride, fumeric acid and adipic acid.

9. The adhesive composition of claim 6, wherein:
    the one or more glycols include diethylene glycol; and
    the one or more acids include at least one of maleic anhydride and phthalic anhydride.

10. The adhesive composition of claim 5, wherein the dicyclopentadiene polymer is the reaction product of dicyclopentadiene, at least one dicarboxylic acid, and at least one dihydric alcohol.

11. The adhesive composition of claim 10, wherein the at least one dicarboxylic acid is maleic anhydride.

12. The adhesive composition of claim 10, wherein the at least one dihydric alcohol is at least one of diethylene glycol, ethylene glycol and propylene glycol.

13. The adhesive composition of claim 1, wherein the vinyl ester polymer is a reaction product of at least one of methacrylic acid and maleic acid with an epoxy intermediate polymer.

14. The adhesive composition of claim 1, wherein the unsaturated polymer is substantially free of at least one of an acrylate monomer and a methacrylate monomer with greater than 11 carbon atoms and a monomer having a surface tension greater than 28.5 dynes at 20 degrees Celsius.

15. The adhesive composition of claim 1, further comprising:
    at least one impact modifier.

16. The adhesive composition of claim 1, further comprising:
    at least one ethylenically unsaturated acid.

17. The adhesive composition of claim 1, further comprising:
    at least one chlorinated elastomeric polymer.

18. The adhesive composition of claim 1, further comprising:
    a catalyst system.

19. The adhesive composition of claim 1, further comprising:
    at least one of: a chelating agent, a plasticizer, at least one organometalic salt, a wax, a dibasic organic acid, a sulfur bearing compound, or an adhesion promoter.

20. The adhesive composition of claim 1, wherein the adhesive composition is free of styrene monomer.

* * * * *